3,002,001
4-ALKYLIMINO-1-[AROMATIC-(LOWER - ALKYL)]-1,4-DIHYDROQUINOLINES AND THEIR PREPARATION

Alexander R. Surrey, Albany, N.Y., assignor to Sterling Drug Inc., New York, N.Y., a corporation of Delaware
No Drawing. Filed Apr. 3, 1958, Ser. No. 726,032
16 Claims. (Cl. 260—288)

This invention relates to compositions of matter of the class of basic quinoline derivatives, to their acid-addition salts, and to the preparation of these compounds.

The invention here resides in a composition of matter selected from the group consisting of: (a) a 1,4-dihydroquinoline that is substituted by an aromatic-(lower-alkyl) radical at the 1-position and by an alkyl-imino radical having four to ten carbon atoms at the 4-position, and that can be further substituted by from one to two other substituents selected from the group consisting of halo, lower-alkoxy, lower-alkylmercapto, lower-alkyl, nitro and trifluoromethyl radicals at one of the normally aromatic positions of the quinoline nucleus, and, optionally, by a lower-alkyl substituent at the 2-position of the quinoline nucleus; and, (b) acid-addition salts thereof.

Among the compounds of my invention are those which in free base form are represented by the structural Formula I

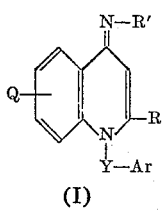

(I)

where Q represents H or from one to two substituents at positions 3, 5, 6, 7 and 8 of the quinoline nucleus selected from the group consisting of halo, lower-alkoxy, lower-alkylmercapto, lower-alkyl, nitro and trifluoromethyl radicals; R' is an alkyl radical having from four to ten carbon atoms inclusive; R is H or a lower-alkyl radical; Y is a lower-alkylene radical; and Ar is an aromatic radical including phenyl, naphthyl, biphenylyl, thienyl, furyl, pyridyl and pyrimidyl radicals.

In the above general Formula I the quinoline nucleus can be unsubstituted at the positions other than 1 and 4 or it can be substituted further at one to two of the normally aromatic positions of the quinoline ring, namely, 3, 5, 6, 7 or 8, by the substituents named above. When Q designates two substituents, they can be the same or different and can be in any of said available aromatic positions relative to each other. The halo substituents can be chloro, bromo, iodo or fluoro. The lower-alkoxy, lower-alkylmercapto and lower-alkyl substituents have preferably from one to six carbon atoms and include: methoxy, ethoxy, n-propoxy, isopropoxy, n-butoxy, isobutoxy, 2-butoxy, n-pentoxy, n-hexoxy and the like when lower-alkoxy; methylmercapto, ethylmercapto, n-propylmercapto, isobutylmercapto, n-hexylmercapto and the like when lower-alkylmercapto; and methyl, ethyl, n-propyl, isopropyl, n-butyl, n-hexyl and the like when lower-alkyl.

The quinoline nucleus can be further substituted at the 2-position by a lower-alkyl radical represented above as R and illustrated by methyl, ethyl, n-propyl, isobutyl, n-butyl, n-hexyl and the like.

The lower-alkylene radical designated above as Y can have preferably from one to four carbon atoms and is illustrated by —CH$_2$—, —CH$_2$CH$_2$—,

—CH(CH$_3$)CH$_2$—

—CH$_2$CHCH$_3$
—C(CH$_3$)$_2$CH$_2$—

—CH$_2$CHCH$_2$CH$_3$
—CH$_2$CH$_2$CH$_2$—
—CH(CH$_3$)CH$_2$CH$_2$—
—CH$_2$CH$_2$CH$_2$CH$_2$— and the like.

The alkyl radical designated above as R' has from four to ten carbon atoms, illustrated by n-butyl, 2-butyl, isobutyl, n-amyl, isoamyl, n-hexyl, 2-hexyl, 2-methylhexyl, 3-ethylhexyl, n-heptyl, n-octyl, n-nonyl, n-decyl, and the like.

The aromatic radical designated above as Ar preferably stands for a monocarbocyclic-aryl radical having six ring-carbon atoms, i.e., an aryl radical of the benzene series. These preferred embodiments thus include the unsubstituted-phenyl radical and phenyl radicals substituted by substituents including halo, nitro, lower-alkoxy, lower-alkyl, lower-alkylmercapto, lower-alkylsulfonyl, lower-alkylamino, di-(lower-alkyl)amino, trifluoromethyl, lower-acylamino, and the like. The substituted-phenyl radicals have preferably from one to three substituents including those given above; and, furthermore, these substituents can be in any of the available positions of the phenyl nucleus, and where more than one substituent, they can be the same or different and they can be in any of the various position combinations relative to each other. Thus Ar comprehends the unsubstituted-phenyl radical as well as substituted-phenyl radicals illustrated by: nitrophenyl radicals including 4-nitrophenyl, 3-nitrophenyl, 2-nitrophenyl, etc.; (lower-alkoxylated)-phenyl including 3-ethoxyphenyl, 2-methoxyphenyl, 2,4-dimethoxyphenyl, 2,4,6-trimethoxyphenyl, 3,4-diethoxyphenyl, etc.; (lower-alkylated)-phenyl including 4-methylphenyl, 3-ethylphenyl, 2-methylphenyl, 2,4-dimethylphenyl, 3,4,5-trimethylphenyl, 4-isopropylphenyl, etc.; halogenated-phenyl including 2-chlorophenyl, 4-chlorophenyl, 2,4-dibromophenyl, 3-iodophenyl, 2,4-dichlorophenyl, 3,4-dichlorophenyl, 2,4,6-trichlorophenyl, 4-fluorophenyl, etc.; and other substituted-phenyl radicals including 3-trifluoromethylphenyl, 4-methylmercaptophenyl, 4-methylsulfonylphenyl, 4-n-butylaminophenyl, 4-diethylaminophenyl, 2-chloro-4-ethoxyphenyl, 4-acetylaminophenyl, and the like.

Particularly preferred embodiments of my invention are compounds of the above Formula I and their acid-addition salts of Formula II where Y is CH$_2$, Ar is a monocarboxylic-aryl radical, Q is a halo radical and R is H.

Preferred embodiments are my compounds in the form of their acid-addition salts, which can be represented by the general structural Formula II

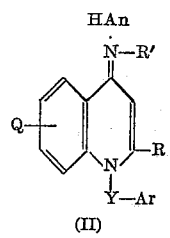

(II)

where Q, R', R, Y and Ar have the meanings designated above and An is an anion.

The anion designated above as An can be any anion and is preferably a chemotherapeutically acceptable anion, for instance, chloride, bromide, iodide, sulfate, phosphate, sulfamate, benzenesulfonate, para-toluenesulfonate, methanesulfonate, ethanesulfonate, citrate, tartrate, and the like; the anion has no appreciable activity of its own in the high dilutions at which the acid-addition salts as a whole are effective. In particular, the anion appears to contribute nothing to the chemotherapeutic properties which inhere to the cation portion of the substituted-1,4-dihydroquinolines of the present invention. However, preferred compounds are those in which An is halide, in particular, chloride, iodide or bromide, since these are derived from readily available starting materials. By a chemotherapeutically acceptable anion, I mean any anion which is innocuous to the animal organism in chemotherapeutic doses of the acid-addition salt, so that beneficial physiological properties inherent in the cation are not vitiated by any possible side-effects ascribable to the anions; in other words, the latter do not substantially affect the chemotherapeutic properties inherent in the cations.

The acid-addition salts are prepared directly as described hereinafter or they are prepared from the free base either by dissolving the free base in an aqueous alkanol solution containing the appropriate acid and isolating the salt by evaporating the solution, or by reacting the free base and acid in an organic solvent, e.g., lower alkanol, in which case the salt separates directly or can be obtained by concentration of the solution. Alternatively, the acid-addition salts can be prepared by treating an acid-addition salt (Formula II) prepared directly as noted above with an anion-exchange resin saturated with the desired anion.

Although chemotherapeutically acceptable salts are preferred, all acid-addition salts are within the scope of my invention. All acid-addition salts are useful as sources of the free base form even if the particular salt per se is not desired as the final product, as for example when the salt is formed only for purposes of purification or identification, or when it is used as an intermediate in preparing a chemotherapeutically acceptable salt by ion exchange procedures.

Concerning the structure of the acid-addition salts represented above as Formula II, the following considerations are presented. From chemical and physical data it appears that structure II is actually a resonance hybrid whose main contributing structures are presented as follows by A↔B:

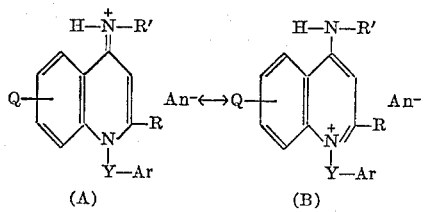

Since my compounds in free base form (Formula I) are readily obtained from their acid-addition salts by reaction with an acid-acceptor, as shown below, and since they are readily reconverted into their acid-addition salts by treatment with an acid, I prefer to represent the acid salt form by Formula II. As an illustration, I prefer to represent the hydrochloride salt of 7-chloro-1-benzyl-4-n-hexylimino-1,4-dihydroquinoline by the following structural Formula IIa:

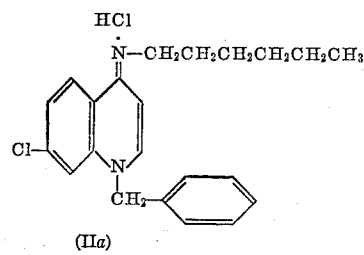

Alternatively, this compound can be named 7-chloro-1-benzyl-4-n-hexylaminoquinolinium chloride or 7-chloro-4-n-hexylaminoquinoline benzochloride and can be represented by the structural Formula IIb:

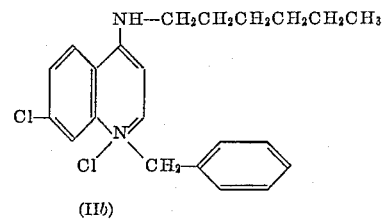

Thus, it is to be understood that although I prefer to represent the acid-addition salt form of my compounds by the structural formula designated above as II, i.e., as an acid-addition salt of a 1-[aromatic-(lower-alkyl)]-4-alkylimino-1,4-dihydroquinoline, this 4-imino-1,4-dihydroquinoline structure actually represents only one of the contributing members of a resonance hybrid; and, further, it is to be understood that the salt form of my invention comprehends not only this 4-imino-1,4-dihydroquinoline structure (as specifically illustrated above as IIa) but also other contributing members of the resonance hybrid including the 1-[aromatic-(lower-alkyl)]-4-alkylaminoquinolinium salt structure (as specifically illustrated above as IIb).

The compounds of Formula II are conveniently prepared by reacting the corresponding 4-alkylaminoquinoline having the Formula III

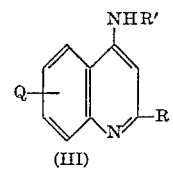

where Q, R' and R have the meanings designated above, with an aromatic-(lower-alkyl) ester of the formula Ar—Y—An, where Ar, Y and An have the meanings given above, and, if the compounds of Formula I are desired, then reacting the resulting acid-addition salt of the 1-[aromatic-(lower-alkyl)]-4-alkylimino-1,4-dihydroquinoline salt (Formula II above) with an acid-acceptor to yield the product in free base form (Formula I). Thus, the reaction of 7-chloro-4-(n-hexylamino)quinoline with 4-chlorobenzyl chloride yields the hydrochloride of 7-chloro-1-(4-chlorobenzyl)-4-(n-hexylimino)-1,4-dihydroquinoline which when treated with an acid-acceptor yields 7-chloro-1-(4-chlorobenzyl)-4-(n-hexylimino)-1,4-dihydroquinoline.

The step of reacting the 4-alkylaminoquinoline (Formula III) with the ester Ar—Y—An is carried out preferably by heating the reactants between about 50° C. and 150° C., a particularly preferred range being between about 80° C. and 120° C. The reaction can be run below 50° C., but it takes longer. The reaction is carried out preferably in an organic solvent which is inert under the conditions of the reaction as for example, acetonitrile, acetone, ethanol, 2-propanol, and the like. When an inert solvent is used, the product usually separates from solution upon cooling, or can be obtained by concentration of the solution. The reaction takes place most readily with aromatic-(lower-alkyl) esters Ar—Y—An where An is the anion of a strong inorganic acid or an organic sulfonic acid. The chloride, bromide or iodide are preferred because of the more ready availability of the requisite aromatic-(lower-alkyl) halides. Compounds where the anion An is other than halogen or anions of strong acids can be prepared by reacting the free base form of my compounds having Formula I with the appropriate acid according to the procedure described above.

The step of reacting the acid-addition salt of the 1-[aromatic-(lower-alkyl)]-4-(alkylimino)-1,4-dihydroquinoline (Formula II) with an acid-acceptor is carried out at room temperature or by warming, if necessary. The reaction can be carried out in an aqueous or organic solvent; however, it is preferably carried out in an organic solvent inert under the conditions of the reaction as for example, anhydrous methanol, ethanol, and the like. The purpose of the acid-acceptor is to take up the hydrogen halide (or HAn) which is split out during the course of the reaction. The acid-acceptor is a basic substance which preferably forms freely water-soluble by-products easily separable from the product of the reaction, including for example, sodium hydroxide, potassium hydroxide, sodium carbonate, potassium carbonate, sodium acetate, sodium alkoxides, potassium alkoxides, sodium amide, and the like.

The compounds of Formulas I and II can also be prepared by reacting the corresponding 4-haloquinolinium halide having the Formula IV

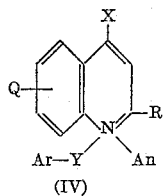

(IV)

where Q, R, Y and Ar have the meanings designated above, An is a halide ion and X is a chloro, bromo or iodo radical, with an alkylamine of the formula $R'-NH_2$ and reacting the resulting HAn acid-addition salt (Formula II) with an acid-acceptor to yield the product in free base form (Formula I). Thus, the reaction of 7-bromo - 1-(2-chloro-4-ethoxybenzyl)-4-iodoquinolinium iodide with n-heptylamine yields the hydriodide of 7-bromo - 4-(n-heptylimino)-1-(2-chloro-4-ethoxybenzyl)-1,4-dihydroquinoline; and, the corresponding compound in free base form is obtained by treating the hydriodide salt with an acid-acceptor as described above.

The reaction of the 4-haloquinolinium halide (Formula IV) with an alkylamine $R'-NH_2$ is carried out preferably by heating the reactants at a temperature between about 50° C. and 150° C., preferably between about 75 and 125° C.; the reaction can be run at room temperature, but it takes longer. The reaction is preferably carried out in an organic solvent which is inert under the conditions of the reaction as for example, ethanol, and the like. If an inert solvent is used, the product usually separates from solution upon cooling, or can be obtained by concentration of the solution.

Evaluation of the 1-(aromatic-alkyl)-4-(alkylimino)-1,4-dihydroquinolines and salts by standard test procedures has shown that they have useful chemotherapeutic properties, in particular, anthelmintic activity as determined in Swiss mice.

The following examples will further illustrate the invention without, however, limiting it thereto.

EXAMPLE 1

A. *1-[aromatic-(lower-alkyl)]-4-haloquinolinium halides*

The preparation of these intermediates is illustrated by the following preparation of 7-chloro-1-(2-chlorobenzyl)-4-iodoquinolinium iodide:

A reaction mixture containing 80 g. of 4,7-dichloroquinoline, 128 g. of 2-chlorobenzyl chloride, 177 g. of sodium iodide and 1200 cc. of acetone was refluxed for twenty-four hours with stirring. The reaction mixture was allowed to cool; and the resulting precipitate was collected and washed successively with acetone, water and acetone. There was thus obtained 130 g. (60% yield) of 7-chloro-1-(2-chlorobenzyl)-4-iodoquinolinium iodide, M.P. 208–209° C. (uncorr.).

Following the above procedure using an equivalent quantity of 4,5-dichloroquinoline in place of 4,7-dichloroquinoline, the product obtained was 5-chloro-1-(2-chlorobenzyl)-4-iodoquinolinium iodide, M.P. 201–202° C. with decompostion.

*Analysis.*—Calcd. for $C_{16}H_{10}Cl_2IN.HI$: C, 35.45; H, 2.04; I−, 23.42. Found: C, 35.28; H, 2.30; I−, 25.6.

Following the above procedure using an equivalent quantity of benzyl chloride in place of 2-chlorobenzyl chloride, the product obtained was 1-benzyl-7-chloro-4-iodoquinolinium iodide, M.P. 220–222° C. with decomposition.

*Analysis.*—Calcd. for $C_{16}H_{11}ClIN.HI$: I, 50.1. Found: I, 48.79.

Following the above procedure in the absence of sodium iodide, 4,7-dichloroquinoline and 2-chlorobenzyl chloride react to form 1-(2-chlorobenzyl)-4,7-dichloroquinolinium chloride; use of 4,7-dibromoquinoline and 2-bromobenzyl bromide in the absence of sodium iodide yields 1-(2-bromobenzyl)-4,7-dibromoquinolinium bromide.

Other 1 - [aromatic-(lower-alkyl)]-4-haloquinolinium iodides that can be prepared following the above procedure using the appropriate 4-haloquinoline, aromatic-(lower-alkyl) halide and sodium iodide include:

3,7-dichloro-4-iodo-1-(3-nitrobenzyl)-quinolinium iodide,
7 - bromo-1-(2,4 - dimethoxybenzyl)-4-iodoquinolinium iodide,
8 - chloro-4-iodo-1-(2,4,6-trimethoxybenzyl)-quinolinium iodide,
1 - (3-ethylbenzyl)-4-iodo-7-trifluoromethyl-quinolinium iodide,
4 - iodo-7-methylmercapto-1-(2-methylmercaptobenzyl)-quinolinium iodide,
7 - chloro-1-[2-(4-chlorophenyl)-ethyl]-4-iodo-2-methylquinolinium iodide,
1 - (4-biphenylylmethyl)-7-chloro-4-iodoquinolinium iodide,
7 - chloro-4-iodo-1(2-thienylmethyl)quinolinium iodide,
7 - chloro-1-(2-furylmethyl)-4-iodoquinolinium iodide,
7 - chloro-4-iodo-1-(3-pyridylmethyl)quinolinium iodide,
7 - chloro-4-iodo-1-(2-pyrimidylmethyl)quinolinium iodide,
7 - chloro-1-(4-dimethylaminobenzyl)-4-iodoquinolinium iodide,
7 - chloro-4-iodo-1-(2-pyridylmethyl)quinolinium iodide,
7 - chloro-4-iodo-1-(2-methoxybenzyl)quinolinium iodide,
6,7 - dichloro-1-[2-(2,4-dimethoxyphenyl)ethyl]-4-iodoquinolinium iodide,
7 - bromo-1-(2-chloro-4-methoxybenzyl)-4-iodoquinolinium iodide,
1 - [4-(4-chlorophenyl)butyl]-4-iodo-3-nitroquinolinium iodide,
6,8 - dimethoxy - 4-iodo-1-(2,4,6-trichlorobenzyl)quinolinium iodide,
8 - n-butoxy-4-iodo-1-(3-trifluoromethylbenzyl)quinolinium iodide,
1 - (4-n-butylmercaptobenzyl)-6-n-hexyloxy-4-iodoquinolinium iodide,
4 - iodo-8-isobutylmercapto-1-(3-phenylpropyl)quinolinium iodide,
7 - chloro - 4-iodo-6-methoxy-1-(4-n-propylsulfonylbenzyl)quinolinium iodide,
1 - (4 - n-butylaminobenzyl)-4-iodo-7-methylquinolinium iodide,
4,7 - diiodo-1-(4-iodobenzyl)quinolinium iodide,
7 - chloro - 4-iodo-1-(2-methylmercaptobenzyl)-3-nitroquinolinium iodide,
1 - (2 - chlorobenzyl)-4-iodoquinolinium iodide, and the like.

B. *4 - alkylimino - 1-[aromatic-(lower-alkyl)]-1,4-dihydroquinolines*

The preparation of these compounds by reacting a 1-[aromatic-(lower-alkyl)]-4-haloquinolinium halide with an alkylamine $R'-NH_2$ is illustrated by the following preparation of 1 - benzyl-7-chloro-4-n-hexylimino-1,4-dihydroquinoline hydrochloride, hydriodide and corresponding base:

A mixture containing 15.2 g. of 1-benzyl-7-chloro-4-iodoquinolinium iodide, 9.1 g. of n-hexylamine and 170 cc. of absolute ethanol was heated; the resulting hot solution was treated with decolorizing charcoal and filtered; and the filtrate was cooled to yield a crystalline precipitate. The precipitate was collected to give 12.3 g. of 1 - benzyl - 7-chloro-4-n-hexylimino-1,4-dihydroquinoline hydriodide, M.P. 198–201° C.

The above hydriodide salt was converted into its free base form by dissolving it in 100 cc. of hot ethanol, cooling the solution to incipient precipitation, adding 5 cc. of 35% aqueous sodium hydroxide, and cooling the resulting solution. The solid that separated was collected to yield 7.5 g. of 1-benzyl-7-chloro-4-n-hexylimino-1,4-dihydroquinoline, M.P. 90–93° C.

The hydrochloride salt was formed by dissolving the 1 - benzyl-7-chloro-4-n-hexylimino-1,4-dihydroquinoline base in hot ethanol, filtering the hot solution, and adding a solution of hydrogen chloride in ethanol until the solution was slightly acidic, cooling the solution, and then adding ether whereupon the crystalline solid product separated. The crystals were collected and recrystallized from isopropyl alcohol to yield 6 g. of 1-benzyl-7-chloro-4-n-hexylimino-1,4-dihydroquinoline hydrochloride, M.P. 252.4–257.8° C. (corr.).

*Analysis.*—Calcd. for $C_{22}H_{25}ClN_2 \cdot HCl$: Cl, 18.21; N, 7.19. Found: Cl, 17.91; N, 7.15.

Alternatively, as discussed hereinabove, 1-benzyl-7-chloro-4-n-hexylimino-1,4-dihydroquinoline hydrochloride can be called 1-benzyl-7-chloro-4-n-hexylaminoquinolinium chloride.

Following the above procedure using 1-benzyl-4,7-dichloroquinolinium chloride in place of 1-benzyl-7-chloro-4-iodoquinolinium iodide, there is obtained directly 1-benzyl-7-chloro-4-n-hexylimino-1,4-dihydroquinoline hydrochloride; using 1-benzyl-4-bromo-7-chloroquinolinium bromide, there is obtained 1-benzyl-7-chloro-4-n-hexylimino-1,4-dihydroquinoline hydrobromide.

Substitution of the hydrogen chloride in the above reaction with 1-benzyl-7-chloro-4-n-hexylimino-1,4-dihydroquinoline by hydrogen bromide, phosphoric acid, sulfuric acid, tartaric acid, sulfamic acid or methanesulfonic acid, there can be obtained 1-benzyl-7-chloro-4-n-hexylimino-1,4-dihydroquinoline hydrobromide, phosphate, sulfate, tartrate, sulfamate or methanesulfonate, respectively, instead of the hydrochloride.

Other 4-alkylimino-1-[aromatic-(lower-alkyl)]-1,4-dihydroquinolines that can be prepared following the above procedure for the preparation of 1-benzyl-7-chloro-4-n-hexylimino-1,4-dihydroquinoline and its hydrohalide salts using the appropriate 1-[aromatic-(lower-alkyl)]-4-iodoquinolinium iodide and alkylamine include those compounds of Examples 2–29.

EXAMPLE 2

3,7-dichloro-4-n-heptylimino-1-(3-nitrobenzyl) - 1,4-dihydroquinoline using 3,7-dichloro-4-iodo-1-(3-nitrobenzyl)-quinolinium iodide and n-heptylamine.

EXAMPLE 3

7-chloro-1-(2-chlorobenzyl)-4-n-decylimino - 1,4 - dihydroquinoline using 7-chloro-1-(2-chlorobenzyl)-4-iodoquinolinium iodide and n-decylamine.

EXAMPLE 4

5-chloro-1-(2-chlorobenzyl)-4 - n - hexylimino-1,4-dihydroquinoline using 5-chloro-1-(2-chlorobenzyl)-4-iodoquinolinium iodide and n-hexylamine.

EXAMPLE 5

7-bromo-1-(2,4-dimethoxybenzyl) - 4-n-octylimino-1,4-dihydroquinoline using 7-bromo-1-(2,4-dimethoxybenzyl)-4-iodoquinolinium iodide and n-octylamine.

EXAMPLE 6

8-chloro-4-(2-methylhexylimino)-1 - (2,4,6-trimethoxybenzyl)-1,4-dihydroquinoline using 8-chloro-4-iodo-1-(2,4,6-trimethoxybenzyl)quinolinium iodide and 2-methylhexylamine.

EXAMPLE 7

1-(3-ethylbenzyl)-4-isoamylimino-7-trifluoromethyl-1,4-dihydroquinoline using 1-(3-ethylbenzyl)-4-iodo-7-trifluoromethyl-quinolinium iodide and isoamylamine.

EXAMPLE 8

7-methylmercapto - 1 - (2-methylmercaptobenzyl)-4-n-nonylimino-1,4-dihydroquinoline using 4-iodo-7-methylmercapto-1-(2-methylmercaptobenzyl)quinolinium iodide and n-nonylamine.

EXAMPLE 9

7-chloro-1-[2-(4 - chlorophenyl)ethyl]-4-n-hexylimino-2-methyl-1,4-dihydroquinoline using 7-chloro-1-[2-(4-chlorophenyl)-ethyl]-4-iodo-2-methylquinolinium iodide and n-hexylamine.

EXAMPLE 10

4-n-amylimino-1-(4-biphenylylmethyl) - 7 - chloro-1,4-dihydroquinoline using 1-(4-biphenylylmethyl)-7-chloro-4-iodoquinolinium iodide and n-amylamine.

EXAMPLE 11

7-chloro-4-n-heptylimino - 1 - (2-thienylmethyl)-1,4-dihydroquinoline using 7-chloro-4-iodo-1-(2-thienylmethyl)-quinolinium iodide and n-heptylamine.

EXAMPLE 12

7-chloro-1-(2-furylmethyl) - 4 - n-octylimino-1,4-dihydroquinoline using 7-chloro-1-(2-furylmethyl)-4-iodoquinolinium iodide and n-octylamine.

EXAMPLE 13

7-chloro-4-n-hexylimino-1-(3 - pyridylmethyl)-1,4-dihydroquinoline using 7-chloro-4-iodo-1-(3-pyridylmethyl)quinolinium iodide and n-hexylamine.

EXAMPLE 14

7-chloro-4-n-hexylimino-1-(2 - pyrimidylmethyl)-1,4-dihydroquinoline using 7-chloro-4-iodo-1-(2-pyrimidylmethyl)-quinolinium iodide and n-hexylamine.

EXAMPLE 15

7-chloro-1-(4 - dimethylaminobenzyl)-4-n-heptylimino-1,4-dihydroquinoline using 7-chloro-1-(4-dimethylaminobenzyl)-4-iodoquinolinium iodide and n-heptylamine.

EXAMPLE 16

7-chloro-4-n-octylimino-1-(2 - pyridylmethyl)-1,4-dihydroquinoline using 7-chloro-4-iodo-1-(2-pyridylmethyl)-quinolinium iodide and n-octylamine.

EXAMPLE 17

7-chloro-4-(2 - ethylbutylimino)-1-(2-methoxybenzyl)-1,4-dihydroquinoline using 7-chloro-4-iodo-1-(2-methoxybenzyl)-quinolinium iodide and 2-ethylbutylamine.

EXAMPLE 18

6,7-dichloro-1-[2-(2,4-dimethoxyphenyl)ethyl] - 4 - (2-ethylhexylimino)-1,4-dihydroquinoline using 6,7-dichloro-1-[2-(2,4-dimethoxyphenyl)ethyl]-4-iodoquinolinium iodide and 2-ethylhexylamine.

EXAMPLE 19

7-bromo-1-(2-chloro-4-methoxybenzyl) - 4 - (3 - hexylimino)-1,4-dihydroquinoline using 7-bromo-1-(2-chloro-4-methoxybenzyl)-4-iodoquinolinium iodide and 3-hexylamine.

EXAMPLE 20

1-[4-(4-chlorophenyl)butyl]-4-(2 - hexylimino)-3-nitro- 1,4-dihydroquinoline using 1-[4-(4-chlorophenyl)butyl]-4-iodo-3-nitroquinolinium iodide and 2-hexylamine.

EXAMPLE 21

6,8-dimethoxy-4-(2 - octylimino)-1-(2,4,6-trichlorobenzyl)-1,4-dihydroquinoline using 6,8-dimethoxy-4-iodo-1-(2,4,6-trichlorobenzyl)quinolinium iodide and 2-octylamine.

EXAMPLE 22

8-n-butoxy-4-(3-nonylimino)-1-(3 - trifluoromethylbenzyl)-1,4-dihydroquinoline using 8-n-butoxy-4-iodo-1-(3-trifluoromethylbenzyl)quinolinium iodide and 3-nonylamine.

EXAMPLE 23

1-(4-n-butylmercaptobenzyl)-4-n-hexylimino-6-n-hexyloxy-1,4-dihydroquinoline using 1-(4-n-butylmercaptobenzyl)-6-n-hexyloxy-4-iodoquinolinium iodide and n-hexylamine

EXAMPLE 24

8-isobutylmercapto-4-n-octylimino-1-(3-phenylpropyl)-1,4-dihydroquinoline using 4-iodo-8-isobutylmercapto-1-(3-phenylpropyl)quinolinium iodide and n-octylamine.

EXAMPLE 25

7 - chloro-4-n-heptylimino-6-methoxy-1-(4-n-propylsulfonylbenzyl)-1,4-dihydroquinoline using 7-chloro-4-iodo-6 - methoxy-1-(4-n-propylsulfonylbenzyl)quinolinium iodide and n-heptylamine.

EXAMPLE 26

1 - (4 - n - butylaminobenzyl) - 4 - n - butylimino - 7 - methyl-1,4-dihydroquinoline using 1-(4-n-butylaminobenzyl)-4-iodo-7-methylquinolinium iodide and n-butylamine.

EXAMPLE 27

7 - iodo - 1 - (4 - iodobenzyl) - 4 - isobutylimino - 1,4-dihydroquinoline using 4,7-diiodo-1-(4-iodobenzyl)quinolinium iodide and isobutylamine.

EXAMPLE 28

7 - chloro - 1 - (2 - methylmercaptobenzyl) - 3 - nitro-4-n-octylimino-1,4-dihydroquinoline using 7-chloro-4-iodo-1-(2-methylmercaptobenzyl)-3-nitroquinolinium iodide and n-octylamine.

EXAMPLE 29

1 - (2 - chlorobenzyl) - 4 - n - hexylimino - 1,4 - dihydroquinoline using 1-(2-chlorobenzyl)-4-iodoquinolinium iodide and n-hexylamine.

The foregoing 4-alkylimino-1-[aromatic-(lower-alkyl)]-1,4-dihydroquinolines of Examples 2–29 inclusive are first isolated as their hydriodide salts which are converted as above into the respective free bases, which in turn can be converted into other acid-addition salts, preferably the hydrochlorides, as above in Example 1B.

EXAMPLE 30

7 - chloro - 1 - (2 - chlorobenzyl) - 4 - n - hexylimino-1,4-dihydroquinoline hydrochloride can be obtained following the procedure described in Example 1B using 1-(2-chlorobenzyl)-4,7-dichloroquinolinium chloride and n-hexylamine.

EXAMPLE 31

7 - bromo - 1 - (2 - bromobenzyl) - 4 - n - heptylimino-1,4-dihydroquinoline hydrobromide can be obtained following the procedure described in Example 1B using 1-(2-bromobenzyl)-4,7-dibromoquinolinium bromide and n-heptylamine.

EXAMPLE 32

*1-benzyl-4-n-butylimino-7-chloro-1,4-dihydroquinoline hydrochloride*

Following the procedure described in Example 1B using 15.2 g. of 1-benzyl-7-chloro-4-iodoquinolinium iodide, 6.6 g. of n-butylamine and 180 cc. of absolute ethanol, there was first obtained 12.2 g. of 1-benzyl-4-n-butylimino-7-chloro-1,4-dihydroquinoline hydriodide, M.P. 218–222° C. This hydriodide salt in 90 cc. of hot ethanol was treated with 5 cc. of 35% aqueous sodium hydroxide as in Example 1B to yield 6.5 g. of 1-benzyl-4-n-butylimino-7-chloro-1,4-dihydroquinoline. This free base form was then dissolved in hot ethanol and the resulting solution treated with a solution of hydrogen chloride in ethanol as in Example 1B to yield 4.2 g. of 1-benzyl-4-n-butylimino-7-chloro-1,4-dihydroquinoline hydrochloride, M.P. 274.2–281.6° C. (corr.), when recrystallized from isopropyl alcohol.

*Analysis.*—Calcd. for $C_{20}H_{21}ClN_2 \cdot HCl$: Cl, 19.62; N, 7.76. Found: Cl, 19.91; N, 7.63.

EXAMPLE 33

*1-benzyl-7-chloro-4-isobutylimino-1,4-dihydroquinoline hydrochloride*

This preparation was carried out following the procedure described in Example 1B using 15.2 g. of 1-benzyl-7-chloro-4-iodoquinolinium iodide, 6.6 g. of isobutylamine and 170 cc. of absolute ethanol. There was first obtained 11.5 g. of 1-benzyl-7-chloro-4-isobutylimino-1,4-dihydroquinoline hydriodide, M.P. 206–209° C. This hydriodide salt dissolved in 60 cc. of hot ethanol was treated with 5 cc. of 35% aqueous sodium hydroxide solution as in Example 1B to give 8.5 g. (68% yield) of 1 - benzyl - 7 - chloro - 4 - isobutylimino - 1,4 - dihydroquinoline, M.P. 148–151° C. Treatment of a hot ethanol solution of this base with a solution of hydrogen chloride in ethanol as in Example 1B yielded 5.8 g. of 1 - benzyl - 7 - chloro - 4 - isobutylimino - 1,4 - dihydroquinoline hydrochloride, M.P. 280.4–286.6° C. (corr.), when recrystallized from isopropyl alcohol.

*Analysis.*—Calcd. for $C_{20}H_{21}ClN_2 \cdot HCl$: Cl, 19.62; N, 7.76. Found: Cl, 19.68; N, 7.67.

EXAMPLE 34

*1-benzyl-7-chloro-4-n-octylimino-1,4-dihydroquinoline hydrochloride*

Following the procedure described in Example 1B using 12.5 g. of 1-benzyl-7-chloro-4-iodoquinolinium iodide, 11.6 g. of n-octylamine and 170 cc. of absolute ethanol, there was obtained 8.2 g. of 1-benzyl-7-chloro-4-n-octylimino-1,4-dihydroquinoline hydriodide, M.P. 168–171° C. The hydriodide was converted into its corresponding free base form by treating a solution of it in ethanol with 5 cc. of 35% aqueous sodium hydroxide as in Example 1B to yield 4.8 g. of 1-benzyl-7-chloro-4-n-octylimino-1,4-dihydroquinoline, M.P. 75–80° C. This base was converted into the hydrochloride salt as in Example 1B whereupon there was obtained 3.5 g. of 1-benzyl-7-chloro-4-n-octylimino-1,4-dihydroquinoline hydrochloride, M.P. 253.8–256.6° C. (corr.), when recrystallized from isopropyl alcohol.

*Analysis.*—Calcd. for $C_{24}H_{29}ClN_2 \cdot HCl$: Cl, 16.99; N, 6.71. Found: Cl, 16.75; N, 6.49.

EXAMPLE 35

*1-benzyl-7-chloro-4-tertiary-butylimino-1,4-dihydroquinoline hydrochloride*

Following the procedure described in Example 1B using 12.5 g. of 1-benzyl-7-chloro-4-iodoquinolinium iodide, 6.6 g. of tertiary-butylamine and 170 cc. of absolute ethanol, there was first obtained 8.4 g. of 1-benzyl-7-chloro-4-tertiary-butylimino-1,4-dihydroquinoline hydriodide, M.P. 254–258° C., which was converted into its free base form as in Example 1B using 100 cc. of ethanol and 5 cc. of 35% aqueous sodium hydroxide solution. There was obtained 5.1 g. of 1-benzyl-7-chloro-4-tertiary-butylimino-1,4-dihydroquinoline, M.P. 142–145° C., which was converted into its hydrochloride salt as in Example 1B. There was thus obtained 3.3 g. of 1-benzyl-7-chloro-4-tertiary-butylimino-1,4-dihydroquinoline hydrochloride, M.P. 304–305° C., when recrystallized from isopropyl alcohol.

*Analysis.*—Calcd. for $C_{20}H_{21}ClN_2 \cdot HCl$: Cl, 19.62; N, 7.76. Found: Cl, 19.51; N, 7.63.

EXAMPLE 36

*1-benzyl - 7 - chloro-4-n-heptylimino-1,4-dihydroquinoline hydrochloride*

This preparation was carried out following the procedure described in Example 1B using 12.5 g. of 1-benzyl-7-chloro-4-iodoquinolinium iodide, 10.4 g. of n-heptylamine and 170 cc. of absolute ethanol. There was first obtained 10.7 g. of 1-benzyl-7-chloro-4-n-heptylimino-1,4-dihydroquinoline hydriodide, M.P. 178–183° C. The hydriodide in 100 cc. of ethanol was treated with 5 cc. of 35% aqueous sodium hydroxide as in Example 1B to yield 6.1 g. of 1 - benzyl-7-chloro-4-n-heptylimino-1,4-dihydroquinoline, M.P. 68–72° C., which was converted into its hydrochloride salt as in Example 1B. There was thus obtained 3.5 g. of 1-benzyl-7-chloro-4-n-heptylimino - 1,4 - dihydroquinoline hydrochloride, M.P. 258.2–261.0° C. (corr.), when recrystallized from isopropyl alcohol.

*Analysis.*—Calcd. for $C_{23}H_{27}ClN_2 \cdot HCl$: Cl, 17.58; N, 6.95. Found: Cl, 17.70; N, 6.68.

EXAMPLE 37

*7 - chloro-1-(2-chlorobenzyl)-4-n-hexylimino-1,4-dihydroquinoline hydrochloride*

Following the procedure described in Example 1B using 16.3 g. of 7-chloro-1-(2-chlorobenzyl)-4-iodoquinolinium iodide, 9.1 g. of n-hexylamine and 170 cc. of absolute ethanol, there was first obtained 9.2 g. of 7-chloro-1-(2-chlorobenzyl)-4-n-hexylimino - 1,4 - dihydroquinoline hydriodide, M.P. 193–200° C. Treatment of this hydriodide salt as in Example 1B using 100 cc. of ethanol and 5 cc. of 35% aqueous sodium hydroxide solution yielded 7.0 g. of 7 - chloro-1-(2-chlorobenzyl)-4-n-hexylimino-1,4-dihydroquinoline, M.P. 120–127° C., which was converted into the corresponding hydrochloride salt as in Example 1B. There was thus obtained 5.1 g. of 7-chloro-1-(2-chlorobenzyl)-4-n-hexylimino - 1,4 - dihydroquinoline hydrochloride, M.P. 229.2–233.2° C. (corr.), when recrystallized from isopropyl alcohol.

*Analysis.*—Calcd. for $C_{22}H_{24}Cl_2N_2 \cdot HCl$: Cl, 25.11; N, 6.61. Found: Cl, 24.83; N, 6.53.

EXAMPLE 38

*4-n-amylimino-1-benzyl-7-chloro-1,4-dihydroquinoline hydrochloride*

This preparation was carried out following the procedure described in Example 1B using 12.5 g. of 1-benzyl-7-chloro-4-iodoquinolinium iodide, 7.8 g. of n-amylamine and 170 cc. of absolute ethanol. There was first obtained 10.5 g. of 4-n-amylimino-1-benzyl-7-chloro-1,4-dihydroquinoline hydriodide, M.P. 215–218° C. Treatment of a solution of this hydriodide salt in 100 cc. of ethanol and 5 cc. of 35% aqueous sodium hydroxide as in Example 1B yielded 6.0 g. of 4-n-amylimino-1-benzyl-7-chloro-1,4-dihydroquinoline, M.P. 103–107° C. Conversion of the base into its hydrochloride salt as in Example 1B yielded 4.5 g. of 4-n-amylimino-1-benzyl-7-chloro - 1,4 - dihydroquinoline hydrochloride, M.P. 257.6–267.2° C. (corr.).

*Analysis.*—Calcd. for $C_{21}H_{23}ClN_2 \cdot HCl$: Cl, 18.89; N, 7.47. Found: Cl, 18.63; N, 7.35.

EXAMPLE 39

A. *4-alkylaminoquinolines*

The preparation of these intermediate compounds is illustrated by the following synthesis of 4-n-butylamino-7-chloroquinoline:

A mixture containing 60 g. of 4,7-dichloroquinoline, 44 g. of n-butylamine and 60 g. of phenol was heated with stirring at about 130° C. for about fifteen hours. The reaction mixture was cooled and dissolved in chloroform. The chloroform solution was first washed with dilute aqueous sodium hydroxide solution, then with water, and then treated with decolorizing charcoal and filtered. The filtrate was evaporated by distilling in vacuo to give 49 g. (70% yield) of 4-n-butylamino-7-chloroquinoline, M.P. 129.8–135.4° C., when recrystallized once from n-heptane.

*Analysis.*—Calcd. for $C_{13}H_{15}ClN_2$: $N_{AP}$, 5.97; $N_K$, 11.94. Found: $N_{AP}$, 5.86; $N_K$, 11.76.

Following the above procedure but using an equivalent quantity of 4,7-dichloro-2-methylquinoline in place of 4,7-dichloroquinoline and using n-hexylamine in place of n-butylamine, there was obtained 7-chloro-4-n-hexylamino-2-methylquinoline, M.P. 132–133° C.

*Analysis.*—Calcd. for $C_{16}H_{21}ClN_2$: Cl, 12.81. Found: Cl, 13.36.

Following the above procedure used for the preparation of 4-n-butylamino-7-chloroquinoline using isobutylamine, n-amylamine, isoamylamine, n-hexylamine, 2-hexylamine, 2-methylhexylamine, n-heptylamine, n-octylamine, n-nonylamine or n-decylamine in place of n-butylamine, there is obtained, respectively, 7-chloro-4-isobutylaminoquinoline, 4-n-amyl-7-chloroquinoline, 7-chloro-4-isoamylaminoquinoline, 7-chloro-4-n-hexylaminoquinoline, 7-chloro-4-(2-hexylamino)quinoline, 7 - chloro-4-(2 - methylhexylamino)quinoline, 7 - chloro-4-n-heptylaminoquinoline, 7-chloro-4-n-octylaminoquinoline, 7-chloro-4-n-nonylaminoquinoline or 7-chloro-4-n-decylaminoquinoline.

Other 4-alkylaminoquinolines that can be prepared following the above procedure for the preparation of 4-n-butylamino-7-chloroquinoline using the appropriate 4-chloro-, 4-bromo-, or 4-iodoquinoline and alkylamine include: 7-bromo-4-n-hexylaminoquinoline, 4-n-amylamino-6,7-dichloroquinoline, 4 - n-heptylamino-3-nitroquinoline, 7-chloro-3-nitro-4-n-octylaminoquinoline, 4-n-hexylamino-6-methoxyquinoline, 4-n-butylamino-7-methylquinoline, 4-isoamylamino-7-trifluoromethylquinoline, 4-n-hexylamino-6-methylmercaptoquinoline, and the like.

B. *4 - alkylimino-1-[aromatic-(lower-alkyl)]-1,4-dihydroquinolines*

The preparation of these compounds by reacting a 4-alkylaminoquinoline with an aromatic-(lower-alkyl) ester of a strong acid designated above as Ar—Y—An is illustrated by the following preparation of 4-n-butylimino-7-chloro-1(2-chlorobenzyl) - 1,4 - dihydroquinoline hydrochloride:

A mixture containing 8.0 g. of 7-chloro-4-n-butylaminoquinoline, 5.49 g. of 2-chlorobenzyl chloride and 50 cc. of acetonitrile was refluxed for about five hours. The reaction mixture was allowed to cool and the precipitate that separated was collected and recrystallized from ethanol to yield 7.24 g. of 4-n-butylimino-7-chloro-1-(2-chlorobenzyl)-1,4-dihydroquinoline hydrochloride, M.P. 274.0–277.4° C. (corr.).

*Analysis.*—Calcd. for $C_{20}H_{20}Cl_2N_2 \cdot HCl$: Cl, 26.87; N, 7.08. Found: Cl, 26.42; N, 7.00.

The hydrochloride salt can be converted into its free base form by dissolving it in hot ethanol, adding 35% aqueous sodium hydroxide and cooling the resulting solution whereupon the solid 4-n-butylimino-7-chloro-1-(2-chlororbenzyl)-1,4-dihydroquinoline that separates is collected.

Other 4 - alkylimino - 1 - [aromatic-(lower-alkyl)]-1,4-dihydroquinolines that can be prepared following the above procedure using the appropriate 4-alkylaminoquinoline and aromatic-(lower-alkyl) ester of a strong acid include those compounds given in Examples 40–58 inclusive.

EXAMPLE 40

7-chloro-4-isobutylimino - 1 - (2 - methoxybenzyl)-1,4- dihydroquinoline hydrochloride using 7-chloro-4-isobutylaminoquinoline and 2-methoxybenzyl chloride.

EXAMPLE 41

4-n-amylimino-7-chloro-1-(3 - nitrobenzyl) - 1,4 - dihydroquinoline hydrobromide using 4-n-amylamino-7-chloroquinoline and 3-nitrobenzyl bromide.

EXAMPLE 42

7-chloro-4-isoamylimino-1-(2 - methylmercaptobenzyl)-1,4-dihydroquinoline hydrochloride using 7-chloro-4-isoamylaminoquinoline and 2-methylmercaptobenzyl chloride.

EXAMPLE 43

7-chloro-4-n-hexylimino-1-(3-phenylpropyl) - 1,4 - dihydroquinoline hydrobromide using 7 - chloro - 4 - n-hexylaminoquinoline and 3-phenylpropyl bromide.

EXAMPLE 44

7 - chloro - 1 - [4 - (4 - chlorophenyl)butyl]-4-(2-hexylimino)-1,4-dihydroquinoline hydrochloride using 7-chloro-4-(2-hexylamino)-quinoline and 4-(4-chlorophenyl)butyl chloride.

EXAMPLE 45

7-chloro-1-(2,4 - dichlorobenzyl) - 4 - (2 - methylhexylimino)-1,4-dihydroquinoline hydrochloride using 7-chloro-4-(2-methylhexylamino)quinoline and 2,4-dichlorobenzyl chloride.

EXAMPLE 46

1 - (4 - biphenylylmethyl)-7-chloro-4-n-heptylimino-1,4-dihydroquinoline hydrochloride using 7-chloro-4-n-heptylaminoquinoline and 4-biphenylylmethyl chloride.

EXAMPLE 47

7 - chloro-1-(4-iodobenzyl)-4-n-octylimino-1,4-dihydroquinoline hydriodide using 7-chloro-4-n-octylaminoquinoline and 4-iodobenzyl iodide.

EXAMPLE 48

7-chloro-1-(2-naphthylmethyl) - 4 - n - nonylimino-1,4-dihydroquinoline hydrochloride using 7-chloro-4-n-nonylaminoquinoline and 2-naphthylmethyl chloride.

EXAMPLE 49

7 - chloro-4-n-decylimino-1-(2-pyridylmethyl)-1,4-dihydroquinoline hydrochloride using 7-chloro-4-n-decylaminoquinoline and 2-pyridylmethyl chloride.

EXAMPLE 50

7-bromo - 4 - n - hexylimino-1-(2-pyrimidylmethyl)-1,4-dihydroquinoline hydrochloride using 7-bromo-4-n-hexylaminoquinoline and 2-pyrimidylmethyl chloride.

EXAMPLE 51

4 - n - amylimino-6,7-dichloro-1-(2-thienylmethyl)-1,4-dihydroquinoline hydrochloride using 4-n-amylamino-6,7-dichloroquinoline and 2-thienylmethyl chloride.

EXAMPLE 52

1 - benzyl-4-n-heptylimino-3-nitro-1,4-dihydroquinoline hydrochloride using 4-n-heptylamino-3-nitroquinoline and benzyl chloride.

EXAMPLE 53

7 - chloro-1-(3,4-dimethoxybenzyl)-3-nitro-4 - n - octylimino-1,4-dihydroquinoline hydrochloride using 7-chloro-3-nitro-4-n-octylaminoquinoline and 3,4-dimethoxybenzyl chloride.

EXAMPLE 54

1-(4-n-butylsulfonylbenzyl)-4-n-hexylimino-6-methoxy-1,4-dihydroquinoline hydrobromide using 4-n-hexylamino-6-methoxyquinoline and 4-n-butylsulfonylbenzyl bromide.

EXAMPLE 55

4-n-butylimino - 7 - methyl-1-(3-trifluoromethylbenzyl)-1,4-dihydroquinoline hydrochloride using 4-n-butylamino-7-methylquinoline and 3-trifluoromethylbenzyl chloride.

EXAMPLE 56

7-chloro-1-(2,4-dibromobenzyl)-4-n-hexylimino-2-methyl-1,4-dihydroquinoline hydrobromide using 7-chloro-4-n-hexylamino - 2 - methylquinoline and 2,4 - dibromobenzyl bromide.

EXAMPLE 57

1-(5-chloro-2-pyridylmethyl) - 4 - isoamylimino - 7 - trifluoromethyl - 1,4 - dihydroquinoline hydrochloride using 4-isoamylamino-7-trifluoromethylquinoline and 5-chloro-2-pyridylmethyl chloride.

EXAMPLE 58

1-(4-ethylbenzyl)-4-n-hexylimino - 6 - methylmercapto-1,4-dihydroquinoline hydrochloride using 4-n-hexylamino-6-methylmercaptoquinoline and 4-ethylbenzyl chloride.

The compounds of Examples 40–58 inclusive are converted into their free base form by reaction with an acid-acceptor according to the procedure given in Example 1B for the conversion of 1-benzyl-7-chloro-4-n-hexylimino-1,4-dihydroquinoline hydriodide into 1-benzyl-7-chloro-4 - n - hexylimino - 1,4 - dihydroquinoline by reaction with aqueous sodium hydroxide solution.

Chemotherapeutic evaluation of the 4-alkylimino-1-[aromatic-(lower-alkyl)]-1,4-dihydroquinolines and acid-addition salts of the foregoing examples has demonstrated that they are useful as anthelmintic agents. When administered orally to Swiss mice infected with the tapeworm *Hymenolepis nana*, the compounds completely cured the animals of the infection at drug levels below about 30 to 300 mg. per kg. of body weight per day. Some of the compounds, for instance, 1-benzyl-4-n-butylimino-7-chloro-1,4-dihydroquinoline hydrochloride and 1-benzyl-7-chloro-4-n-hexylimino - 1,4 - dihydroquinoline hydrochloride, have $ED_{50}$ values below about 20 mg. per kg. per day, $ED_{50}$ meaning the effective dose necessary to clear 50% of the Swiss mice of the tapeworm infection.

My new 4-alkylimino-1-[aromatic-(lower-alkyl)]-1,4-dihydroquinolines and acid-addition salts can be prepared for use by incorporating them in syrup, tablet or capsule form for oral administration. They can be formulated in the same manner as known compounds having anthelmintic properties, such as piperazine citrate.

I claim:
1. A composition of matter selected from the group consisting of: (a) the 4-alkylimino-1-[aromatic-(loweralkyl)]-1,4-dihydroquinoline having the structural formula

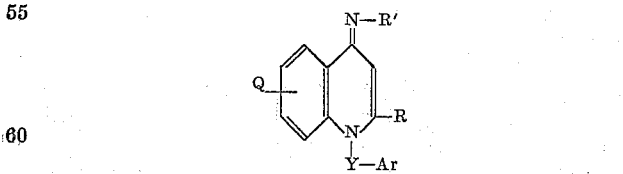

where Q is selected from the group consisting of H and from one to two substituents at positions 3, 5, 6, 7 and 8 of the quinoline nucleus selected from the group consisting of halo, lower-alkoxy, lower-alkylmercapto, lower-alkyl, nitro and trifluoromethyl radicals, R' is an alkyl radical having from four to ten carbon atoms inclusive, R is a member selected from the group consisting of H and lower-alkyl radicals, Y is a lower-alkylene radical, and Ar is an aromatic radical selected from the group consisting of phenyl, naphthyl, biphenylyl, thienyl, furyl, pyridyl and pyrimidyl radicals; and, (b) acid-addition salts thereof.

2. The 4-alkylimino-1-arylmethyl-7-halo-1,4-dihydroquinoline having the structural formula

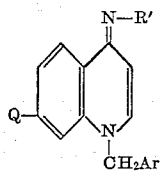

where Q is a halo radical, R' is an alkyl radical having from four to ten carbon atoms inclusive, and Ar is the monocarbocyclic-aryl radical having six ring-carbon atoms.

3. The acid-addition salt of the compound of claim 2.

4. The acid-addition salt of the 4-alkylimino-1-benzyl-7-halo-1,4-dihydroquinoline where the 4-alkylimino substituent has from four to ten carbon atoms inclusive.

5. The acid-addition salt of the 4-alkylimino-7-halo-1-(halobenzyl)-1,4-dihydroquinoline where the 4-alkylimino substituent has from four to ten carbon atoms inclusive.

6. 1 - benzyl - 7 - chloro - 4 - n - hexylimino - 1,4-dihydroquinoline hydrochloride.

7. 1 - benzyl - 7 - chloro - 4 - n - octylimino - 1,4 - dihydroquinoline hydrochloride.

8. 1 - benzyl - 7 - chloro - 4 - n - heptylimino - 1,4 - dihydroquinoline hydrochloride.

9. 7 - chloro - 1 - (2 - chlorobenzyl) - 4 - n - hexylimino-1,4-dihydroquinoline hydrochloride.

10. 1 - benzyl - 7 - chloro - 4 - n - amylimino - 1,4-dihydroquinoline hydrochloride.

11. A process for the preparation of the acid-addition salt of the 4-alkylimino-1-[aromatic-(lower-alkyl)]-1,4-dihydroquinoline having the structural formula

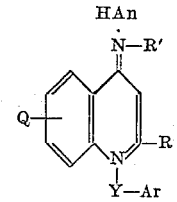

where Q is selected from the group consisting of H and from one to two substituents at positions 3, 5, 6, 7 and 8 of the quinoline nucleus selected from the group consisting of halo, lower-alkoxy, lower-alkylmercapto, lower-alkyl, nitro and trifluoromethyl radicals, R' is an alkyl radical having from four to ten carbon atoms inclusive, R is a member selected from the group consisting of H and lower-alkyl radicals, Y is a lower-alkylene radical, Ar is an aromatic radical selected from the group consisting of phenyl, naphthyl biphenylyl, thienyl, furyl pyridyl and pyrimidyl radicals, and An is an anion of strong acid, which comprises reacting the corresponding 4-alkylaminoquinoline having the formula

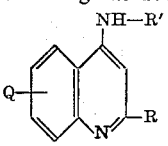

where Q, R' and R have the meanings already designated, with an ester having the formula Ar—Y—An.

12. A process for the preparation of the acid-addition salt of the 4-alkylimino-1-arylmethyl-7-halo-1,4-dihydroquinoline having the structural formula

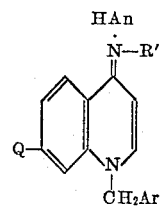

where Q is a halo radical, R' is an alkyl radical having from four to ten carbon atoms inclusive, Ar is the monocarbocyclic-aryl radical having six ring-carbon atoms, and An is the anion of a strong acid, which comprises reacting the corresponding 4-alkylamino-7-haloquinoline with an ester having the formula ArCH₂—An.

13. A process for the preparation of a hydrohalide of the 4 - alkylimino - 1 - [aromatic - (lower - alkyl)] - 1,4-dihydroquinoline having the structural formula

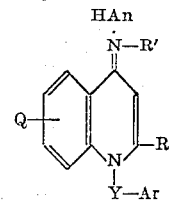

where Q is selected from the group consisting of H and from one to two substituents at positions 3, 5, 6, 7 and 8 of the quinoline nucleus selected from the group consisting of halo, lower-alkoxy, lower-alkylmercapto, lower-alkyl, nitro and trifluoromethyl radicals, R' is an alkyl radical having from four to ten carbon atoms inclusive, R is a member selected from the group consisting of H and lower-alkyl radicals, Y is a lower-alkylene radical, Ar is an aromatic radical selected from the group consisting of phenyl, naphthyl, biphenyl, thienyl, furyl, pyridyl and pyrimidyl radicals, and An is a member selected from the group consisting of chloride, bromide and iodide anions, which comprises reacting a 4-haloquinolinium halide having the formula

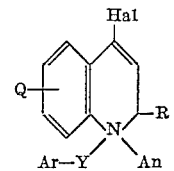

where Q, R, Y, Ar and An have the meanings already given and Hal is a member selected from the group consisting of chloro, bromo and iodo radicals, with an alkylamine having the formula R'—NH₂.

14. A process for the preparation of the compound having the structural formula

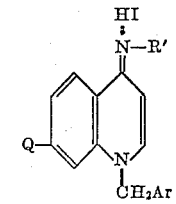

where Q is a halo radical, R' is an alkyl radical having from four to ten carbon atoms inclusive, and Ar is the monocarbocyclicaryl radical having six ring-carbon atoms, which comprises reacting a 4-iodoquinolinium iodide having the formula

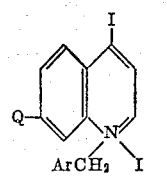

with an alkylamine having the formula R'—NH₂.

15. A process for the preparation of the compound having the structural formula

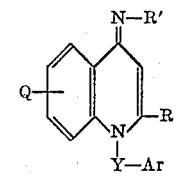

where Q is selected from the group consisting of H and from one to two substituents at positions 3, 5, 6, 7 and 8 of the quinoline nucleus selected from the group consisting of halo, lower-alkoxy, lower-alkylmercapto, lower-alkyl, nitro and trifluoromethyl radicals, R' is an alkyl radical having from four to ten carbon atoms inclusive, R is a member selected from the group consisting of H and lower-alkyl radicals, Y is a lower-alkylene radical, and Ar is an aromatic radical selected from the group consisting of phenyl, naphthyl, biphenylyl, thienyl, furyl, pyridyl and pyrimidyl radicals, which comprises reacting the corresponding acid-addition salt with an acid-acceptor.

16. A process for the preparation of the compound having the structural formula

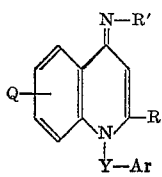

where Q is selected from the group consisting of H and from one to two substituents at positions 3, 5, 6, 7 and 8 of the quinoline nucleus selected from the group consisting of halo, lower-alkoxy, lower-alkylmercapto, lower-alkyl, nitro and trifluoromethyl radicals, R' is an alkyl radical having from four to ten carbon atoms inclusive, R is a member selected from the group consisting of H and lower-alkyl radicals, Y is a lower-alkylene radical, and Ar is an aromatic radical selected from the group consisting of phenyl, naphthyl, biphenylyl, thienyl, furyl, pyridyl and pyrimidyl radicals, which comprises reacting the corresponding hydrohalide acid-addition salt with an acid-acceptor.

References Cited in the file of this patent
UNITED STATES PATENTS 2,554,737   Haefliger et al. _____ May 29, 1951

OTHER REFERENCES

Elderfield: Heterocyclic Compounds, vol. 4, p. 167 (1952).
Gopalchari: Chem. Abstracts, vol. 49, p. 3967 (1955), citing contribution of J. Sci. Ind. Research (India), 13B, pp. 15–20 (1954).
Schock: Journal American Chemical Society, pp. 1670–72, vol. 79 (1957).